May 30, 1950 M. E. BROWN 2,509,476
POWER-DRIVEN HOSE REEL FOR TANK TRUCKS
Filed Aug. 28, 1946 2 Sheets-Sheet 1
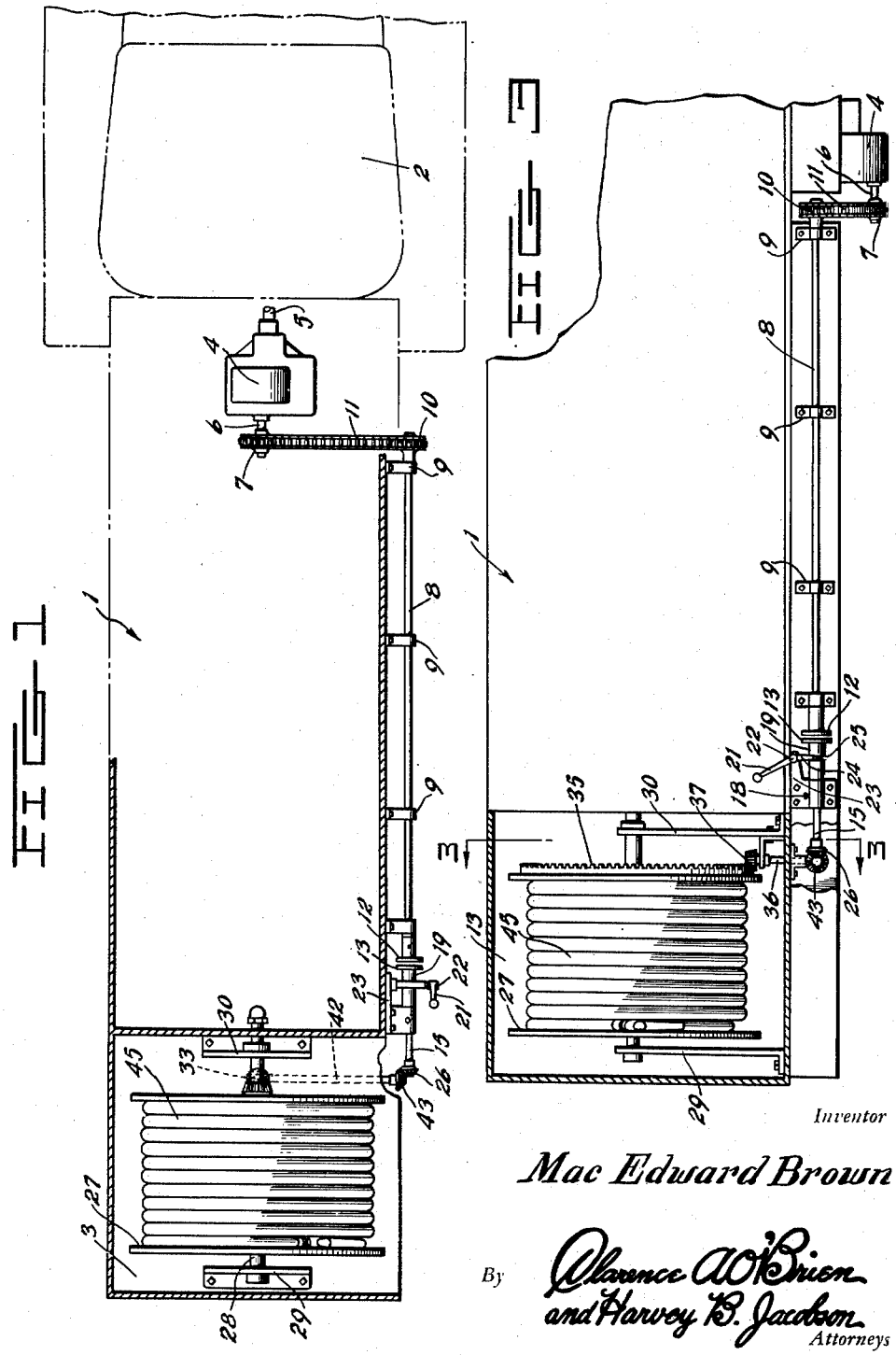
Inventor
*Mac Edward Brown*
By *Clarence A. O'Brien and Harvey B. Jackson*
Attorneys May 30, 1950 — M. E. BROWN — 2,509,476
POWER-DRIVEN HOSE REEL FOR TANK TRUCKS
Filed Aug. 28, 1946 — 2 Sheets-Sheet 2
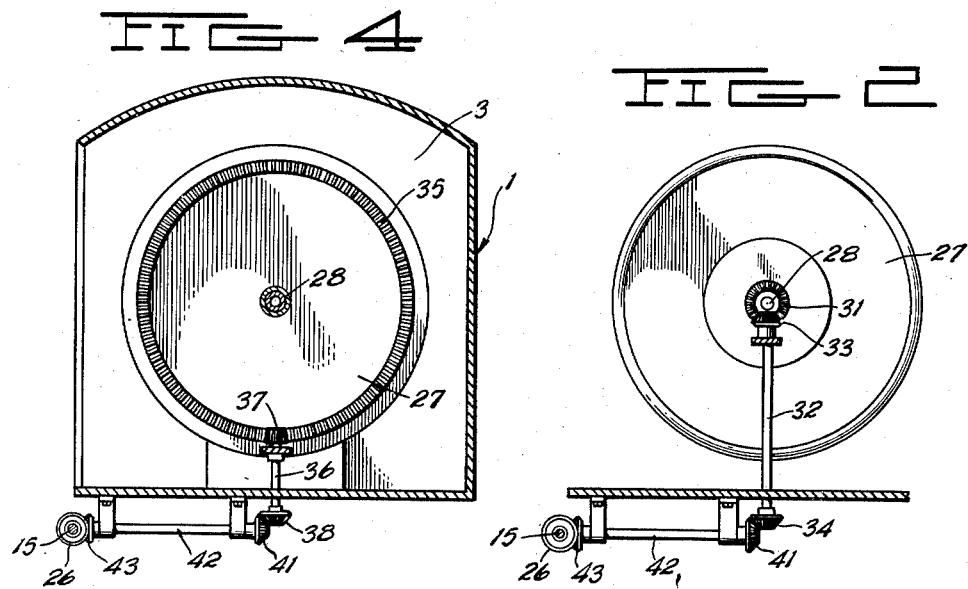
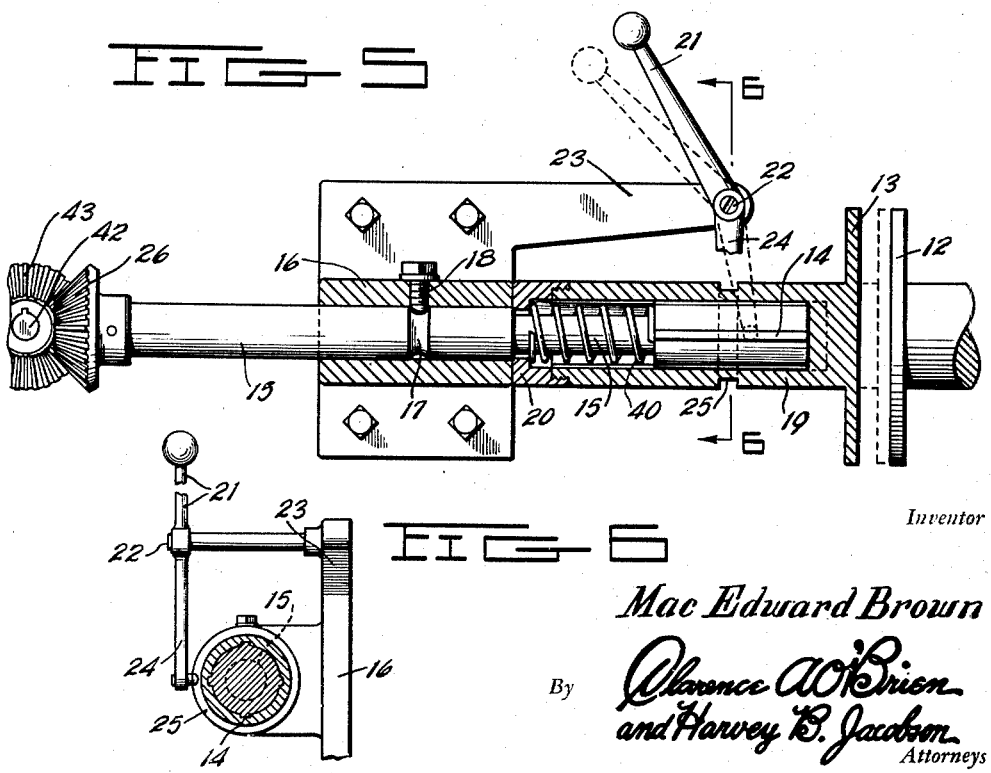
Inventor
Mac Edward Brown
By Clarence A. O'Brien
and Harvey B. Jacobson
Attorneys Patented May 30, 1950

2,509,476

UNITED STATES PATENT OFFICE 2,509,476

POWER-DRIVEN HOSE REEL FOR TANK TRUCKS

Mac Edward Brown, Binghamton, N. Y.

Application August 28, 1946, Serial No. 693,530

7 Claims. (Cl. 242—87)

This invention relates to improvements in power driven hose reels for tank trucks.

An object of the invention is to provide an improved power driven hose reel for tank trucks which will include a suitable power take-off from the truck, and clutch control gearing between the same and said reel, whereby a fuel hose used for filling storage tanks for oil burner equipped homes and buildings may be readily reeled in after the supply of fuel oil has been pumped into the storage tank.

Another object of the invention is to provide a rotatably mounted hose reel adapted to be positioned at any desired position on a tank truck, together with a power take-off mechanism geared thereto through suitable gears and shafts, and controlled by a clutch whereby the hose may be manually unreeled from the reel for connecting the same to an oil burner storage tank filling connection to fill the same with fuel oil, and by operating said clutch, the power take-off mechanism will be directly connected with the reel by interconnected gears and shafts for reeling in the hose and winding it back up on the reel.

Another object of the invention is to provide a highly efficient form of power driven hose reel for tank trucks which will be positive in action and relatively inexpensive to manufacture and produce.

Other objects will appear as the description proceeds.

In the accompanying drawings which form a part of this application,

Figure 1 is a plan view of a tank truck with the improved power driven hose reel in place thereon;

Figure 2 is an end view of the reel and drive connection therefor shown in Fig. 1;

Figure 3 is a plan view of a tank truck with a modified drive connection for the power driven hose reel;

Figure 4 is a sectional view taken on line 4—4 of Fig. 3;

Figure 5 is a longitudinal sectional view through the clutch mechanism for the power driven hose reel, and Figure 6 is a sectional view taken on the line 6—6 of Figure 5.

Like characters of reference are used throughout the following specification and the accompanying drawings to designate corresponding parts.

In carrying out the invention, there is illustrated a tank truck generally designated by the reference numeral 1 formed with a cab 2 on its forward end, and provided with a hose reel compartment 3 at its rear end.

The power take-off for operating the hose reel may be connected directly with the transmission or with the gear box 4, the same being connected by the shaft 5 to the automobile engine (not shown), and having a rearwardly extending driving shaft 6 upon which the sprocket 7 is mounted for rotation therewith. A driving shafting is provided and includes a rearwardly extending shaft 8 and a complementary shaft 15.

The shaft 8 is mounted in the bearing bracket 9, and supports the sprocket 10 on its forward end, to be connected with the sprocket 7 by means of the chain 11. A clutch disc 12 is mounted on the rear end of the shaft 8, and cooperates with the longitudinally movable clutch disc 13 supported upon the splined member 14, which in turn is supported upon the forward end of the short shaft 15 which extends through the bracket bearing 16, and is keyed thereto by means of the annular groove 17 formed about the shaft 15 and the cooperating locking bolt 18 which extends through the bracket 16 into said groove 17. The coil spring 40 is disposed about the forward end of the shaft 15 engaging the rear end of the splined member 14 to normally urge the clutch disc 13 in a forward direction. The clutch disc 13 is provided with a rearwardly extending collar portion 19 which is threaded at its rear end into the rear bushing 20 disposed about the shaft 15 and in contact with the bearing bracket 16.

The clutch actuating lever 21 is pivoted at 22 on the forwardly extending arm 23 on the bracket 16, and has its lower end 24 engaged in the slot 25 in said collar 19, whereby when the actuating lever 21 is moved rearwardly, the clutch disc 13 will be engaged with the clutch disc 12 for transmitting power from the power take-off to the gear 26 on the rear end of the shaft 15 to wind the hose 45 on the hose reel. Conversely, when the actuating lever 21 is moved forwardly, the clutch plates will be separated to stop the rotation of the shaft 15 and gear 26 which is connected with the said hose reel.

In Figures 1 and 4 of the drawings, the hose reel 27 is mounted upon the shaft 28 between the reel supporting brackets 29 and 30, and is provided with a small gear 31 disposed about the shaft 28 and secured to said reel. The vertically mounted shaft 32 supports the gears 33 and 34 at its upper and lower ends respectively, for meshing with the gear 31 and with the gear 41 on the adjacent end of the transversely extending shaft 42. A gear 43 on the opposite end of the shaft 42 will mesh with the gear 26 on shaft 15, thereby completing the driving connections from the power take-off to said reel.

In Figures 2 and 3 of the drawings, a slightly modified form of drive is illustrated, and comprises the large annular ring gear 35 on the end of the reel 27, and the short vertical shaft 36 suitably mounted for rotation and supporting the bevel gears 37 and 38 on its upper and lower ends respectively, to mesh with the large ring gear 35 and with the bevel gear 41 on the adjacent end of the shaft 42, whose opposite end supports a bevel gear 43 which in turn meshes with the gear 26 on the shaft 15.

From the foregoing description, it will be apparent that there has been devised and provided a highly efficient form of power driven hose reel for tank trucks which may be installed in any desired location on the trucks depending upon the form and construction thereof.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In combination with a tank truck, a shaft journalled in said truck, a power driven hose reel rotatably supported thereon, a gear mounted on said shaft, a power take-off including a driving sprocket, shafting mounted longitudinally on said truck, a gear on one end of said shafting, means for connecting said gear with said reel shaft gear and a sprocket on the opposite end thereof, a chain connected between said sprockets, and a clutch mechanism interposed between said shafting, said means including a connecting shaft having opposite gear terminals.

2. In combination with a tank truck, a power driven hose reel rotatably supported thereon, gear means supported in engagement with the reel, a power take-off including a driving sprocket, shafting mounted longitudinally on said truck, a gear on one end of said shafting, means for connecting said gear with said gear means including a connecting shaft having opposed terminal gears and a sprocket on the opposite end thereof, a chain connected between said sprockets, a clutch mechanism interposed between said shafting, said clutch mechanism including a fixed clutch disc and a movable clutch disc, and resilient means for normally urging said movable clutch disc toward said fixed clutch disc.

3. A fluid delivery truck, having a reel housing chamber formed therein, a shaft journalled in said housing, a power driven reel supported thereon, a gear disposed at one end of the reel, a power take-off, including a sprocket supported on the truck, a shaft mounted longitudinally to the side of the truck, chain transmission means connected with the power take-off sprocket and shaft, a short shaft mounted on the truck, clutch means for selectively moving said longitudinal shaft and short shaft into engagement, a connecting shaft having opposed gear ends connected between the short shaft and reel gear, whereby rotation is selectively imparted to the reel from the power take-off.

4. A driving mechanism for a fluid delivery truck supported hose reel comprising a drive shaft, a power driven reel rotatably mounted on the truck, said reel including an annular ring gear secured at one end thereof, means for selectively connecting said drive shaft and reel gear including a connecting shaft having gears on its opposite ends drivingly connected to said drive shaft and reel gear.

5. A driving mechanism for a fluid delivery truck supported hose reel comprising a power take-off mechanism disposed on the truck, a drive shaft longitudinally bracketed to the truck, chain transmission means connecting said take-off mechanism and drive shaft, a shaft journalled at one end of the truck, a hose reel mounted thereon, a gear disposed on one end of the shaft, means for selectively connecting said reel gear and driven shaft including an intermediate shaft connected to said gear and shaft for imparting rotation from the shaft to the gear.

6. A driving mechanism for a fluid delivery truck supported hose reel comprising a power take-off mechanism disposed on the truck, a drive shaft longitudinally bracketed to the truck, chain transmission means connecting said take-off mechanism and drive shaft, a shaft journalled at one end of the truck, a hose reel mounted thereon, a gear disposed on one end of the shaft, means for selectively connecting said reel gear and driven shaft, wherein said means includes a clutch mechanism interposed in said drive shaft, a connecting shaft disposed between said reel gear and drive shaft, said connecting shaft having complementary gears.

7. A driving mechanism for a fluid delivery truck supported hose reel comprising a power take-off mechanism disposed on a truck, a drive shaft longitudinally supported on a side of a truck for rotation thereon, chain transmission means connecting said power take-off and drive shaft, a shaft journalled on the truck, a hose reel mounted thereon, an annular ring gear secured to said reel, a gear carried by said drive shaft, a clutch mechanism interposed in said drive shaft including a fixed clutch disk and a movable clutch disk, a manually operable lever pivotally connected with said clutch mechanism for selectively operating same and resilient means for normally biasing said movable clutch disk relative to said fixed clutch disk, a connecting shaft disposed between said reel gear and drive shaft, said connecting shaft having complementary gears on its opposite ends, one of said gears meshing with the reel ring gear and the other meshing with the drive shaft gear, for selectively rotating the hose reel, said operating lever including a bracket plate secured to the truck, and a lever pivoted thereon.

MAC EDWARD BROWN.

REFERENCES CITED

The following references are of record in the file of this patent:

UNITED STATES PATENTS

| Number | Name | Date |
| --- | --- | --- |
| 1,152,672 | Tuite | Sept. 7, 1915 |
| 1,888,644 | Turzicky | Nov. 22, 1932 |
| 2,250,269 | Lockwood | July 22, 1941 |
| 2,315,085 | Churchward | Mar. 30, 1943 |